(12) United States Patent
Funakoshi et al.

(10) Patent No.: US 8,649,951 B2
(45) Date of Patent: Feb. 11, 2014

(54) SHIFT-BY-WIRE FAIL CONTROL DEVICE FOR VEHICLE WITH AUTOMATIC TRANSMISSION

(75) Inventors: Hidekazu Funakoshi, Isehara (JP); Hiroaki Akazawa, Zama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 231 days.

(21) Appl. No.: 12/812,573

(22) PCT Filed: Feb. 25, 2009

(86) PCT No.: PCT/IB2009/000346
§ 371 (c)(1),
(2), (4) Date: Aug. 12, 2010

(87) PCT Pub. No.: WO2009/106958
PCT Pub. Date: Sep. 3, 2009

(65) Prior Publication Data
US 2011/0010064 A1    Jan. 13, 2011

(30) Foreign Application Priority Data
Feb. 26, 2008    (JP) .................................. 2008-043809

(51) Int. Cl.
G06F 7/00 (2006.01)
G06F 17/00 (2006.01)
G06F 19/00 (2011.01)

(52) U.S. Cl.
USPC ................. 701/62; 701/64; 477/97; 477/906; 477/907

(58) Field of Classification Search
USPC .......... 701/51, 53, 58, 62–65; 477/34, 97, 98, 477/110, 906, 907; 74/335; 340/456
See application file for complete search history.

(56) References Cited

U.S. PATENT DOCUMENTS

2002/0143455 A1 * 10/2002 Bidner et al. .................... 701/69
2004/0053743 A1    3/2004 Tsuzuki et al.
(Continued)

FOREIGN PATENT DOCUMENTS

JP    52-10178 B2    3/1977
JP    5-272633 A    10/1993
(Continued)

OTHER PUBLICATIONS

International Preliminary Report on Patentability issued in PCT/IB2009/000346, mailed on Sep. 10, 2010 (5 pages).

(Continued)

Primary Examiner — Jeffrey Shapiro
(74) Attorney, Agent, or Firm — Osha Liang LLP (57) ABSTRACT

A shifting apparatus includes an actuator to direct a travel range setting of a vehicle transmission, a selector to indicate a desired travel range setting, a transmission controller to move the actuator into the travel range setting in response to the desired travel range setting of the selector, and a restrictor to restrict an output of a drive motor if the vehicle transmission is in a travel range setting other than the desired travel range setting. A method to control a vehicle transmission includes detecting a travel range setting of the vehicle transmission, detecting a desired travel range setting of a selector, and entering a limp-home mode if the detected travel range setting is different from the desired travel range setting and a detected vehicle travel direction corresponding to the detected travel range setting is the same as a desired travel direction corresponding to the desired travel range setting.

15 Claims, 7 Drawing Sheets

(56) References Cited

U.S. PATENT DOCUMENTS

| | | | |
|---|---|---|---|
| 2006/0081085 A1* | 4/2006 | Otsuka et al. | 74/473.21 |
| 2006/0094565 A1* | 5/2006 | Sato et al. | 477/99 |
| 2006/0271260 A1* | 11/2006 | Matsuzaki et al. | 701/48 |
| 2007/0167283 A1* | 7/2007 | Sato et al. | 477/156 |
| 2008/0153665 A1* | 6/2008 | Uchiyama | 477/49 |

FOREIGN PATENT DOCUMENTS

| | | | |
|---|---|---|---|
| JP | 2004-052819 A | 2/2004 | |
| JP | 2004-125061 A | 4/2004 | |
| JP | 6-213025 A | 8/2004 | |
| JP | 2007-132387 A | 5/2007 | |

OTHER PUBLICATIONS

European Search Report from related European Application No. 09715459.5 dated Mar. 20, 2012 (6 pages).

Patent Abstracts of Japan Publication No. 05272633 dated Oct. 19, 1993 (1 page).

International Search Report issued in PCT/IB2009/000346, mailed on Dec. 8, 2009, 2 pages.

Chinese Office Action issued in Chinese Application No. 2009801064701.3 dated Nov. 29, 2012, and translation thereof (28 pages).

* cited by examiner

| DRIVER'S SELECTION OPERATION | | CONDITION OF T/M (M/V RANGE POSITION) | | SHIFT-BY-WIRE FAIL CONTROL | | |
|---|---|---|---|---|---|---|
| BEFORE OPERATION | AFTER OPERATION | BEFORE ACTIVATION | AFTER ACTIVATION | PRIOR ART | PRESENT INVENTION | |
| P→ | P | P→ | P | NOT-NECESSARY | NOT-NECESSARY | |
| | | | R | FS | FS | |
| | | | N | FS | NOT-NECESSARY | |
| | | | D | FS | FS | |
| R→ | P | R→ | P | FS | NOT-NECESSARY | |
| | | | R | FS | LH | |
| | | | N | FS | NOT-NECESSARY | |
| | | | D | FS | FS | |
| N→ | P | N→ | P | FS | NOT-NECESSARY | |
| | | | R | FS | FS | |
| | | | N | FS | NOT-NECESSARY | |
| | | | D | FS | FS | |
| D→ | P | D→ | P | FS | NOT-NECESSARY | |
| | | | R | FS | FS | |
| | | | N | FS | NOT-NECESSARY | |
| | | | D | FS | LH | |
| P→ | R | P→ | P | FS | NOT-NECESSARY | |
| | | | R | FS | LH | |
| | | | N | FS | NOT-NECESSARY | |
| | | | D | FS | FS | |
| R→ | R | R→ | P | FS | NOT-NECESSARY | |
| | | | R | NOT-NECESSARY | NOT-NECESSARY | |
| | | | N | FS | NOT-NECESSARY | |
| | | | D | FS | FS | |
| N→ | R | N→ | P | FS | NOT-NECESSARY | |
| | | | R | FS | LH | |
| | | | N | FS | NOT-NECESSARY | |
| | | | D | FS | FS | |
| D→ | R | D→ | P | FS | NOT-NECESSARY | |
| | | | R | FS | LH | CASE 1 |
| | | | N | FS | NOT-NECESSARY | |
| | | | D | FS | FS | CASE 2 |

FIG. 7

| DRIVER'S SELECTION OPERATION | | CONDITION OF T/M (M/V RANGE POSITION) | | SHIFT-BY-WIRE FAIL CONTROL | | |
|---|---|---|---|---|---|---|
| BEFORE OPERATION | AFTER OPERATION | BEFORE ACTIVATION | AFTER ACTIVATION | PRIOR ART | PRESENT INVENTION | |
| P→ | N | P→ | P | FS | NOT-NECESSARY | |
| | | | R | FS | FS | |
| | | | N | FS | NOT-NECESSARY | |
| | | | D | FS | FS | |
| R→ | N | R→ | P | FS | NOT-NECESSARY | |
| | | | R | FS | FS | |
| | | | N | FS | NOT-NECESSARY | |
| | | | D | FS | FS | |
| N→ | N | N→ | P | FS | NOT-NECESSARY | |
| | | | R | FS | FS | |
| | | | N | NOT-NECESSARY | NOT-NECESSARY | |
| | | | D | FS | FS | |
| D→ | N | D→ | P | FS | NOT-NECESSARY | |
| | | | R | FS | FS | |
| | | | N | FS | NOT-NECESSARY | |
| | | | D | FS | FS | |
| P→ | D | P→ | P | FS | NOT-NECESSARY | |
| | | | R | FS | FS | |
| | | | N | FS | NOT-NECESSARY | |
| | | | D | FS | LH | |
| R→ | D | R→ | P | FS | NOT-NECESSARY | |
| | | | R | FS | FS | CASE 4 |
| | | | N | FS | NOT-NECESSARY | |
| | | | D | FS | LH | CASE 3 |
| N→ | D | N→ | P | FS | NOT-NECESSARY | |
| | | | R | FS | FS | CASE 6 |
| | | | N | FS | NOT-NECESSARY | |
| | | | D | FS | LH | CASE 5 |
| D→ | D | D→ | P | FS | NOT-NECESSARY | |
| | | | R | FS | FS | |
| | | | N | FS | NOT-NECESSARY | |
| | | | D | NOT-NECESSARY | NOT-NECESSARY | |

SHIFT-BY-WIRE FAIL CONTROL DEVICE FOR VEHICLE WITH AUTOMATIC TRANSMISSION

CROSS-REFERENCE TO RELATED APPLICATIONS

The present application claims priority from Japanese Patent Application No. 2008-043809, filed Feb. 26, 2008, the contents of which are hereby incorporated by reference in their entirety.

BACKGROUND OF THE DISCLOSURE

1. Field of the Disclosure

Embodiments of the present disclosure relate to a sift-by-wire fail control device for a vehicle with an automatic transmission (e.g., a continuously variable or "stepless" transmission, a step automatic transmission, or an automated manual transmission capable of automatically shifting gears of a manual transmission).

2. Description of the Related Art

An typical automatic transmission has a park (P) range, a reverse travel (R) range, a neutral (N) range, a forward automatic transmission (D) range, and the like, determining respective gear-shift modes, in that order. A driver may perform a manual selection operation among these ranges. A manual valve is moved in accordance with the selection operation. When the manual valve is located at a position corresponding to the selected range, gear-shift corresponding to the selected range is obtained.

Thus, a shift lever operated by a driver has been typically mechanically coupled with a manual valve by a link mechanism, a wire, or the like, and hence, the manual valve has been moved in accordance with a selection operation using the mechanical system.

Because the link mechanism, the wire, or the like, is provided, the mechanical system may require a relatively large amount of (volumetric) space. In addition, the use of electronic control and the reduction in size of vehicles are becoming more commonplace in recent years. Thus, a so-called "shift-by-wire" automatic transmission has been suggested, in which a manual valve is moved in accordance with a selection operation by a driver under electronic control.

In the former shift-by-wire system, the selection operation with the shift lever is electronically detected, an actuator is moved in accordance with a detection signal, and the manual valve is shifted to a range position corresponding to the selection operation.

The system meets the requirements for electronic control reduction in size of vehicles because the large arrangement space for the mechanical system, such as the link mechanism or the wire, is not necessary.

In the shift-by-wire system, because the manual valve is moved in accordance with the selection operation under the electronic control, it is important to take a measure for fail-safe, to prepare for an unexpected situation, such as that the manual valve is not moved in accordance with the selection operation due to a failure in the actuator or a failure in an electronic control system.

Formerly, for example, Japanese Unexamined Patent Application Publication No. 06-213025 suggested a mechanism for fail-safe. In the mechanism, the output of an engine was reduced when a failure occurs in a traveling condition, the failure in which a manual valve is not moved in accordance with a selection operation; and the operation of the engine was stopped when the failure occurs in a stop condition.

Unfortunately, with such a mechanism for fail-safe, the operation of the engine is unconditionally stopped in any situation when a vehicle is stopped and if the failure, in which the manual valve is not moved in accordance with the selection operation, occurs. Hence, the vehicle is inhibited from traveling.

Therefore, even when a driver intends to drive the vehicle to a repair shop, to the driver's home, or to a safe parking location, the vehicle may not travel from a stopped position under its own power, and hence, the vehicle must be moved by a wrecker or tow truck.

SUMMARY OF THE CLAIMED SUBJECT MATTER

In one aspect, embodiments disclosed herein relate to a shifting apparatus of a vehicle transmission including an actuator to direct the vehicle transmission into a travel range setting, a selector to select a desired travel range setting, an actuator detector to output the travel range setting of the actuator to a transmission controller, a selector detector to output the desired travel range setting of the selector to the transmission controller, the transmission controller to move the actuator into the travel range setting in response to the desired travel range setting of the selector, and a restrictor device to restrict an output of a drive motor if the transmission controller determines the actuator to be in a travel range setting other than the desired travel range setting determined by the selector detector.

In another aspect, embodiments disclosed herein relate to a method to control a vehicle transmission including detecting a travel range setting of the vehicle transmission, detecting a desired travel range setting of a selector, entering a limp-home mode if the detected travel range setting is different from the desired travel range setting, and a detected vehicle travel direction corresponding to the detected travel range setting is the same as a desired travel direction corresponding to the desired travel range setting.

In another aspect, embodiments disclosed herein relate to a shifting apparatus of a vehicle transmission including an actuator to direct a travel range setting of the vehicle transmission, a selector to indicate a desired travel range setting, a shift unit to move the actuator into the travel range setting in response to the desired travel range setting of the selector, and a restrictor to restrict an output of a drive motor if the vehicle transmission is in a travel range setting other than the desired travel range setting.

In another aspect, embodiments disclosed herein relate to a vehicle including a drive motor and a vehicle transmission including a means for indicating a desired travel range setting, a means for directing a travel range setting of the vehicle transmission in response to the indicated desired travel range setting, and a means for restricting an output of a drive motor if the directed travel range setting is other than the desired travel range setting.

BRIEF DESCRIPTION OF DRAWINGS

Features of the present disclosure will become more apparent from the following description in conjunction with the accompanying drawings.

DETAILED DESCRIPTION

An implementation of an exemplary embodiment of the present disclosure is described below in detail according to the Figures.

Figure 1:
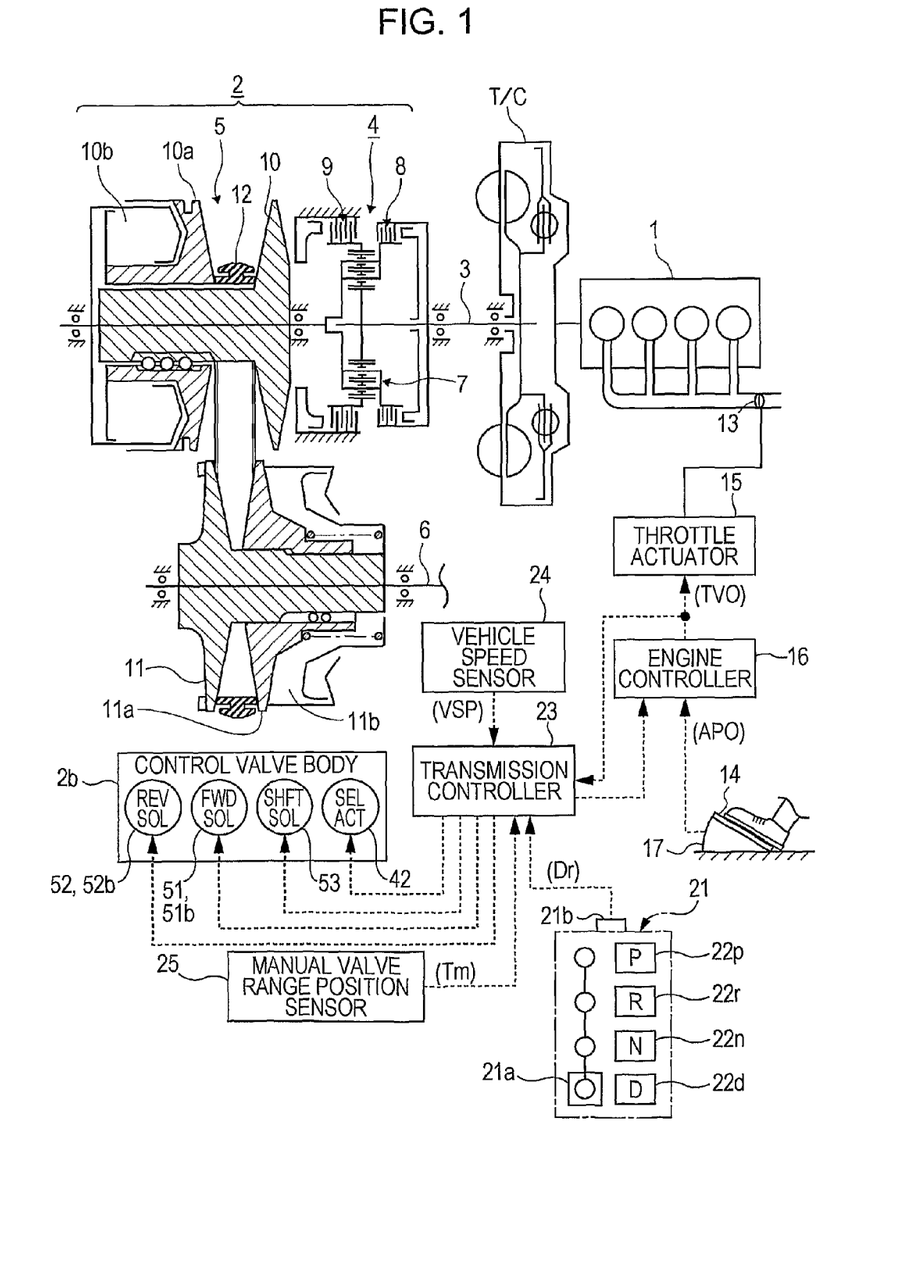
FIG. 1 is a schematic system diagram showing a powertrain and its control system of a vehicle with a V-belt type continuously variable transmission including a shift-by-wire fail control device according to an embodiment of the present disclosure.

FIG. 1 illustrates a powertrain and its control system of a vehicle with a V-belt continuously variable transmission including a shift-by-wire fail control device according to the embodiment of the present disclosure.

An engine 1 serving as a motor, and an automatic transmission 2 define a powertrain for a vehicle with an automatic transmission.

The automatic transmission 2 converts the speed of rotation of the engine 1 in accordance with a selected gear ratio and to an output rotation speed. In select embodiments, the automatic transmission 2 may be a V-belt continuously variable transmission. As such, the automatic transmission 2 may include an input shaft 3, a forward/reverse change mechanism 4, a V-belt transmission mechanism 5, and an output shaft 6. The rotation from the engine 1 may be input to the input shaft 3 through a lockup torque converter T/C.

The forward/reverse change mechanism 4 may have a double pinion planet gear set 7. When a forward clutch 8 is engaged, the rotation of the input shaft 3 can be directly transmitted to the V-belt transmission mechanism 5. When a reverse brake 9 is engaged, the rotation of the input shaft 3 is reversely transmitted to the V-belt transmission mechanism 5. When both the forward clutch 8 and the reverse brake 9 are disengaged, the rotation of the input shaft 3 is not transmitted to the V-belt transmission mechanism 5.

The V-belt transmission mechanism 5 may include a primary pulley 10 at a driving side, a secondary pulley 11 at a driven side, and a V-belt 12. The primary pulley 10 receives the rotation from the forward/reverse change mechanism 4. The secondary pulley 11 is coupled to be located on the output shaft 6. The V-belt 12 is wound around or displaced about the pulleys 10 and 11.

The primary and secondary pulleys 10 and 11 include flanges 10a and 11a which may rotate with respect to other flanges. The flanges 10a and 11a may be movable flanges that may be shifted in an axial direction. The positions of the movable flanges 10a and 11a may be controlled using a difference between a pressure in a cylinder chamber 10b and a pressure in a cylinder chamber 11b.

The V-belt transmission mechanism 5 transmits the rotation of the primary pulley 10 to the secondary pulley 11 via the V-belt 12, and then to the output shaft 6.

During the transmission of the rotation, a line pressure, which may be a gear-shift control original pressure in accordance with a transmission input torque, may be supplied to the secondary-pulley cylinder chamber 11b. A gear-shift control pressure, which may be determined by a gear-shift control valve using the line pressure as an original pressure, may be supplied to the primary-pulley cylinder chamber 10b. The position of the movable flanges 10a and 11a in the axial direction may be controlled on the basis of the ratio of the gear-shift control pressure of the primary-pulley cylinder chamber 10b to the line pressure of the secondary-pulley cylinder chamber 11b. Thus, an arc diameter of the V-belt 12 wound around the pulleys 10 and 11, that is, an inter-pulley transmission ratio (i.e., a gear ratio) may be controlled.

The V-belt transmission mechanism 5 may change the gear ratio continuously from a lowermost-speed gear ratio toward a high-speed gear ratio (upshift) in a stepless (or continuous) manner by increasing the gear-shift control pressure (primary pulley pressure), and the V-belt transmission mechanism 5 may change the gear ratio continuously reversely toward the lowermost-speed gear ratio (downshift) in a stepless manner by reducing the gear-shift control pressure (primary pulley pressure).

The rotation from the V-belt transmission mechanism 5 to the output shaft 6 is input to a differential gear device (not shown). The differential gear device drives left and right driving wheels of the vehicle (not shown), so that the vehicle travels.

The engine 1 may be a gasoline engine. A throttle valve 13 for output determination may not be mechanically coupled with an accelerator pedal 14 operable by the driver. The throttle valve 13 is separated from the accelerator pedal 14, and a throttle actuator 15 changes the opening of the throttle valve 13 instead under the electronic control. Therefore, the engine 1 may be a throttle-by-wire gasoline engine in which the opening (throttle valve opening TVO) of the throttle valve 13 is electronically controllable.

The throttle actuator 15 is moved in accordance with a throttle valve opening (TVO) instruction from an engine controller 16.

The engine controller 16 may determine the throttle valve opening (TVO) to a value corresponding to the degree of depression (accelerator pedal opening APO) of the accelerator pedal 14. Thus, an accelerator pedal opening sensor 17 is provided to detect the accelerator pedal opening APO.

The engine controller 16 may obtain the throttle valve opening (TVO) instruction using the accelerator pedal opening APO detected by the sensor 17 with reference to a predetermined map. The engine controller 16 may give the instruction to the throttle actuator 15, and electronically controls the opening of the throttle valve 13 (throttle valve opening TVO) so as to basically correspond to the accelerator pedal opening APO. The throttle valve opening (TVO) instruction, that is, the opening of the throttle valve 13 (throttle valve opening TVO) may be optionally controlled by a factor other than the accelerator pedal operation, for shift-by-wire fail control (described layer) which is a feature of the present disclosure.

The V-belt continuously variable transmission 2 may include a selector lever 21a, which is illustrated in FIG. 1 independently from the V-belt continuously variable transmission 2 for convenience. The driver may use the selector lever 21a to select a gear-shift mode by a manual operation (selection operation) and to give the instruction of the selected gear-shift mode.

The selector lever 21a may penetrates through a transmission tunnel in a vehicle floor (not shown) and may be located near a driver's seat. The driver may manually operate the selector lever 21a according to an operation pattern 21, to select and to give the instruction of the selected gear-shift mode.

The operation pattern 21 of the selector lever 21a may include a P range position at which the V-belt continuously variable transmission 2 is set to a park (P) range, an R range position at which the V-belt continuously variable transmission 2 is set to a reverse travel (R) range, an N range position at which the V-belt continuously variable transmission 2 is set to a neutral (N) range, and a D range position at which the V-belt continuously variable transmission 2 is set to a forward automatic transmission (D) range. The P range position, R range position, N range position, and D range position may be linearly arranged in that logical order but those having ordinary skill in the art will appreciate that other orders may be used.

In addition, a P range switch 22p that outputs a P range signal when the selector lever 21a may be located at the P range position. Similarly, an R range switch 22r that outputs an R range signal when the selector lever 21a is located at the R range position, an N range switch 22n that outputs an N range signal when the selector lever 21a is located at the N range position, and a D range switch 22d that outputs a D range signal when the selector lever 21a is located at the D range position, may be arranged at the selector-lever operation pattern 21.

A hydraulic circuit for engagement/disengagement control of the forward clutch 8 and the reverse brake 9 in the V-belt continuously variable transmission 2 in FIG. 1 may be described below with reference to FIG. 2.

Figure 2:
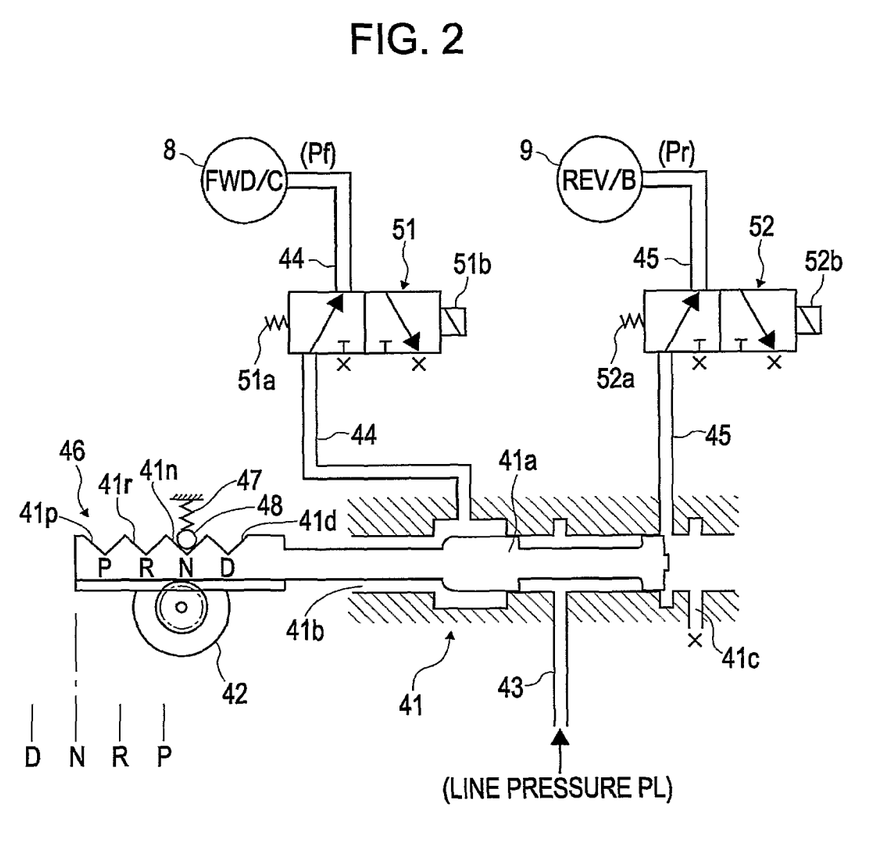
FIG. 2 depicts a hydraulic circuit diagram showing a hydraulic control system and a manual valve and its actuator, the hydraulic control system relating to a forward/reverse change mechanism of the V-belt continuously variable transmission in FIG. 1.

In FIG. 2, a manual valve 41 may be moved in accordance with a range change operation (selection operation) with the selector lever 21a. However, the manual valve 41 may not be mechanically coupled with the selector lever 21a. Though described later in detail, the manual valve 41 may be a shift-by-wire type in which the manual valve 41 is moved in accordance with a selection operation with the selector lever 21a under electronic control.

Hence, at the manual valve 41, the park (P) range position, the reverse travel (R) range position, the neutral (N) range position, and the forward automatic transmission (D) range position may be arranged adjacently to each other in that order. A selection actuator 42 may cause a spool 41a of the manual valve 41 to be shifted to one of the range positions under the electronic control.

The manual valve 41 may be connected to a line pressure circuit 43, to which a line pressure PL (gear-shift control original pressure of the V-belt continuously variable transmission 2) is supplied; a forward pressure circuit 44 toward the forward clutch 8; and a reverse pressure circuit 45 toward the reverse brake 9. A connection portion of the forward pressure circuit 44 and a connection portion of the reverse pressure circuit 45 may be arranged on both sides of a connection portion of the line pressure circuit 43 in a manual-valve axial direction.

The manual valve 41 at the neutral (N) range position in the figure causes the line pressure circuit 43 to be connected to an enclosed space between lands at both ends of the spool 41a, so that the line pressure circuit 43 is fully closed (i.e., isolated from forward and reverse pressure circuits 44 an 45). In addition, in this neutral (N) position, the manual valve 41 allows the forward pressure circuit 44 and the reverse pressure circuit 45 to be in communication with drain ports 41b and 41c, so that any forward clutch pressure Pf (the engagement pressure of the forward clutch 8) and any reverse brake pressure Pr (the engagement pressure of the reverse brake 9) may be removed respectively through the drain ports 41b and 41c. Both the forward clutch 8 and the reverse brake 9 may be disengaged, and hence, the V-belt continuously variable transmission 2 becomes a neutral condition in which power transmission is inhibited.

In the forward (D) position, the manual valve 41 allows the forward pressure circuit 44 to be disconnected from the drain port 41b and to be connected to the line pressure circuit 43, so that the line pressure PL is directed to the forward clutch 8. Accordingly, the forward clutch pressure Pf, which is the engagement pressure of the forward clutch 8, may be generated, and the forward clutch 8 is engaged. Meanwhile, the manual valve 41 causes the reverse pressure circuit 45 to be continuously connected to the drain port 41c. The reverse brake pressure Pr, which is the engagement pressure of the reverse brake 9, is removed through the drain port 41c, so that the reverse brake 9 is disengaged. Accordingly, the V-belt continuously variable transmission 2 is in a condition capable of transmitting forward rotational power.

Further, in the reverse (R) position, the manual valve 41 allows the reverse pressure circuit 45 to be disconnected from the drain port 41c. In addition, the manual valve 41 causes the reverse pressure circuit 45 to be connected to the line pressure circuit 43, so that the line pressure PL is directed to the reverse brake 9. Accordingly, the reverse brake pressure Pr, which is the engagement pressure of the reverse brake 9, is generated, and the reverse brake 9 is engaged. Meanwhile, the manual valve 41 causes the forward pressure circuit 44 to be continuously connected to the drain port 41b. The forward clutch pressure Pf, which is the engagement pressure of the forward clutch 8, is removed through the drain port 41b, so that the forward clutch 8 is disengaged. Accordingly, the V-belt continuously variable transmission 2 is in a condition capable of transmitting reverse rotational power.

When the spool 41a of the manual valve 41 is shifted rightward of the reverse travel (R) range position and into to the park (P) range position, the land at the left side of the spool 41a (FIG. 2) closes the line pressure circuit 43. In addition, the forward pressure circuit 44 and the reverse pressure circuit 45 are connected to the drain ports 41b and 41c, so that the forward clutch pressure Pf, which is the engagement pressure of the forward clutch 8, and the reverse brake pressure Pr, which is the engagement pressure of the reverse brake 9, are removed through the drain ports 41b and 41c. Accordingly, both the forward clutch 8 and the reverse brake 9 are disengaged, and hence, the V-belt continuously variable transmission 2 becomes the neutral condition in which power transmission is inhibited.

A detent mechanism 46 may be provided to position the spool 41a of the manual valve 41 to one of the P, R, N, and D positions when the spool 41a is moved by the selection actuator 42.

The detent mechanism 46 may include a detent ball 48 and triangular cut portions 41p, 41r, 41n, and 41d. The detent ball 48 is pressed by a spring 47 toward the spool 41a in a direction orthogonal to a moving direction of the spool 41a. The triangular cut portions 41p, 41r, 41n, and 41d may be provided at the spool 41a so as to position the spool 41a to one of the P, R, N, and D positions in cooperation with the detent ball 48.

Thus, the arrangement order of the triangular cut portions 41p, 41r, 41n, and 41d corresponds to the arrangement order of the P, R, N, and D range positions at the spool 41a. Also, the arrangement pitch of the triangular cut portions 41p, 41r, 41n, and 41d corresponds to the arrangement pitch of the P, R, N, and D range positions at the spool 41a.

When the detent ball 48 is completely fitted into one of valleys of the triangular cut portions 41p, 41r, 41n, and 41d, for example, as shown in FIG. 2, the manual valve 41 (spool 41a) is correctly positioned at the corresponding range position, and the predetermined gear-shift mode may be achieved.

Figure 3:
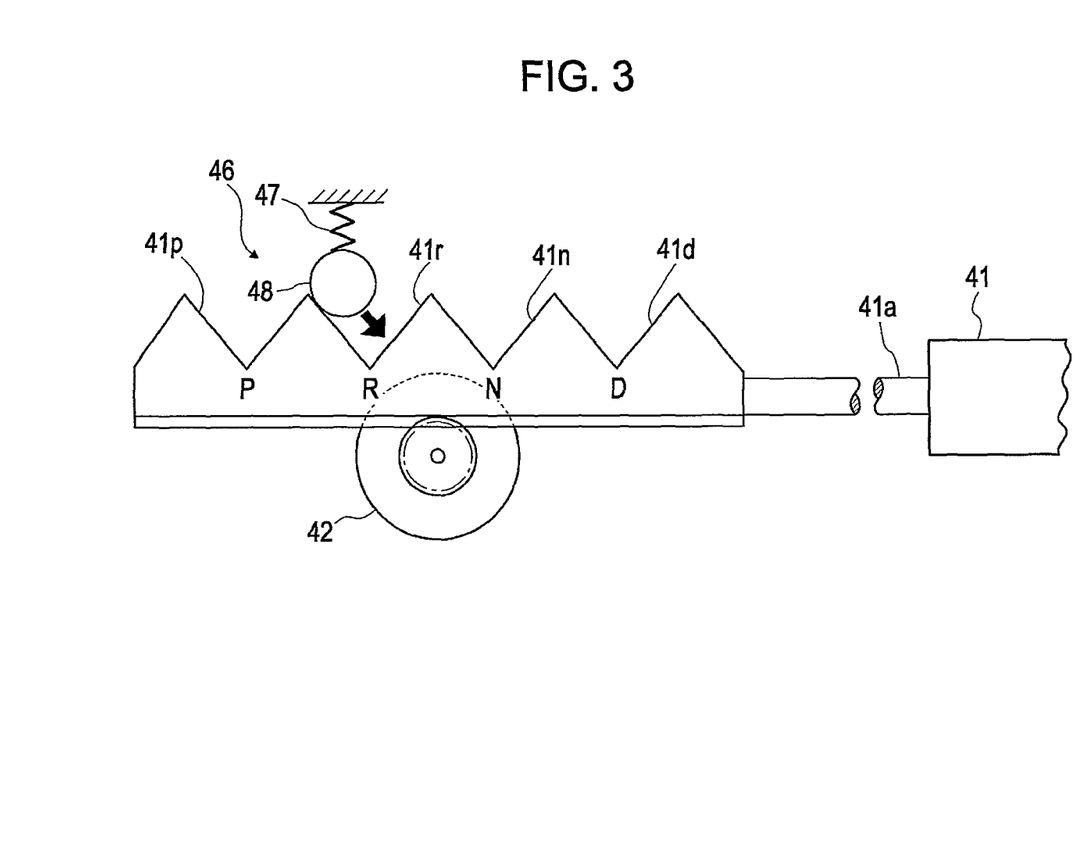
FIG. 3 is an action diagram showing a detent mechanism of the manual valve in FIG. 2 when the manual valve is located at an intermediate position between range positions.

When the detent ball 48 is not completely fitted into one of the valleys of the triangular cut portions 41p, 41r, 41n, and 41d, and is located on one of inclined surfaces between the valleys of the triangular cut portions 41p, 41r, 41n, and 41d, for example, as shown in FIG. 3, the manual valve 41 (spool 41a) is not located at the corresponding range position, and the predetermined gear-shift mode is not achieved.

Although the detent ball 48 is located on one of the inclined surfaces between the valleys of the triangular cut portions 41p, 41r, 41n, and 41d, if the selection actuator 42 is in an inactive condition (including failure), the detent ball 48 may receive a spring force of the spring 47, and may be completely fitted into one of the valleys of the triangular cut portions 41p, 41r, 41n, and 41d as indicated by an arrow in FIG. 3. At this time, it is expected that the detent ball 48 applies a component force to the spool 41a by a cam action in the corresponding moving direction in cooperation with the inclined surface of the triangular cut portions 41p, 41r, 41n, and 41d, and the spool 41a is correctly positioned at the corresponding range position.

However, in some cases, it may also be expected that the cam action is not obtained because of, for example, a large frictional coefficient present between the detent ball 48 and the inclined surface of the triangular cut portions 41p, 41r, 41n, and 41d, the detent ball 48 is left on the inclined surface between the valleys of the triangular cut portions 41p, 41r, 41n, and 41d, and thus the spool 41a is not located correctly at the corresponding range position. In this case, the manual valve 41 does not achieve the predetermined gear-shift mode.

Referring to FIG. 2, shut-off valves 51 and 52 may be respectively inserted into the forward pressure circuit 44 and the reverse pressure circuit 45, in order to perform shift-by-wire fail control according to the embodiment of the present disclosure.

In a normal condition, the shut-off valves 51 and 52 cause the forward pressure circuit 44 and the reverse pressure circuit 45 to be connected by springs 51a and 52a as shown in FIG. 2. In this state, engagement/disengagement of the forward clutch 8 and the reverse brake 9 by the manual valve 41 are available. When solenoids 51b and 52b are turned ON, the forward pressure circuit 44 and the reverse pressure circuit 45 are disconnected, and the forward clutch pressure Pf and the reverse brake pressure Pr are removed. The forward clutch 8 and the reverse brake 9 are disengaged regardless of the selected range position of the manual valve 41, and hence, the V-belt continuously variable transmission 2 becomes the neutral condition in which power transmission is inhibited.

The hydraulic circuits for the engagement/disengagement of the forward clutch 8 and the reverse brake 9 shown in FIG. 2 are contained in a control valve body 2b shown in FIG. 1, together with another gear-shift control hydraulic circuit and a lock-up control hydraulic circuit relating to the V-belt continuously variable transmission 2.

FIG. 1, for its convenience, merely illustrates that the control valve body 2b may include the selection actuator 42 for the manual valve 41, the shut-off valve 51 (solenoid 51b) for the forward pressure circuit 44, the shut-off valve 52 (solenoid 52b) for the reverse pressure circuit 45, and a shift solenoid 53 for a gear-shift control valve (not shown) for the gear-shift control by determining the gear-shift control pressure in the primary-pulley cylinder chamber 10b (see FIG. 1).

A transmission controller 23 in FIG. 1 performs the engagement/disengagement control of the forward clutch 8 and the reverse brake 9 using the selection actuator 42, the forward-pressure-circuit shut-off-valve solenoid 51b, and the reverse-pressure-circuit shut-off-valve solenoid 52b, in addition to the gear-shift control of the V-belt continuously variable transmission 2 using the shift solenoid 53.

The transmission controller 23 may receive a selector lever position (selection operation) signal Dr from a selector-lever position sensor 21b of the selector-lever operation pattern 21, a signal from a vehicle speed sensor 24 that detects a vehicle speed VSP, information relating to a throttle valve opening TVO determined by a throttle valve opening instruction transmitted from the engine controller 16 to the throttle actuator 15, and a signal from a manual valve range position sensor 25 that detects a range position Tm of the manual valve 41.

The transmission controller 23 performs the gear-shift control of the V-belt continuously variable transmission 2 including the engagement/disengagement control of the forward clutch 8 and the reverse brake 9, and the shift-by-wire fail control which is a feature of the present disclosure, as follows, on the basis of the received information via the control valve body 2b.

The gear-shift control may briefly be described first. The transmission controller 23 may drive the selection actuator 42 on the basis of the selector lever position signal Dr from the corresponding one of the range switches 22p, 22r, 22n, and 22d, so that the spool 41a of the manual valve 41 is shifted to the corresponding one of the park (P) range position, the reverse travel (R) range position, the neutral (N) range position, and the forward automatic transmission (D) range position.

Figure 4:
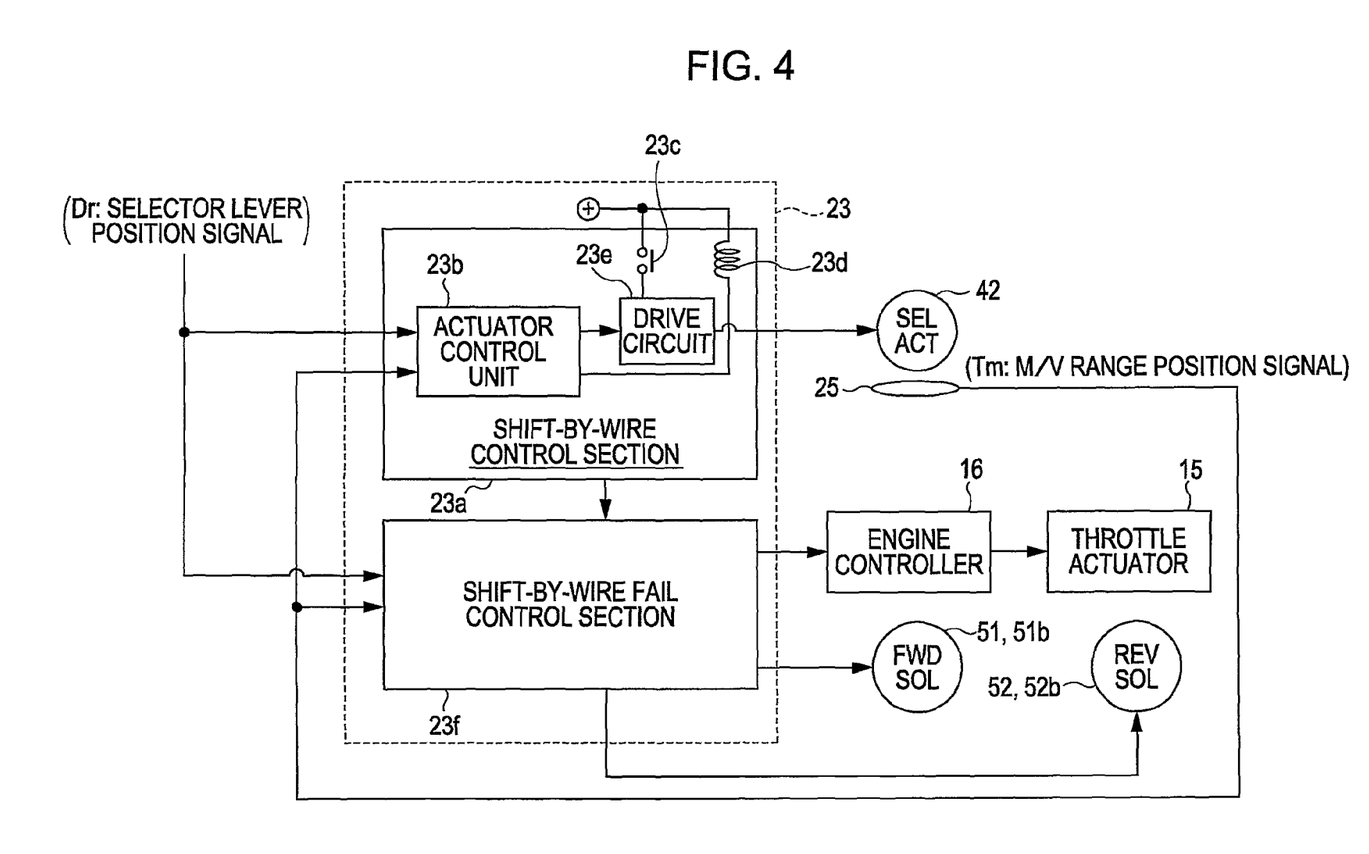
FIG. 4 is a block diagram showing a portion relating to shift-by-wire fail control and a portion for shift-by-wire control of a transmission controller in FIG. 1.

Referring to FIG. 4, the transmission controller 23 may include a shift-by-wire control section 23a for the shift-by-wire control. An actuator control unit 23b in the shift-by-wire control section 23a may compare a selector lever position Dr (range instructed by the driver) with a current range position Tm of the manual valve 41 detected by the sensor 25.

If the selector lever position Dr (instruction range) matches the current range position Tm of the manual valve 41, the actuator control unit 23b turns OFF a solenoid switch 23c by not applying current to a solenoid 23d, and hence an actuator drive circuit 23e is inactivated. Accordingly, the selection actuator 42 is inactivated, so that the manual valve 41 is held at the current range position Tm.

When the selection operation (range change) is made with the selector lever 21a and the selector lever position Dr (instruction range) mismatches the current range position Tm of the manual valve 41, the actuator control unit 23b turns ON the solenoid switch 23c by applying current to the solenoid 23d, and hence the actuator drive circuit 23e is activated. Accordingly, the selection actuator 42 is driven.

At this time, the actuator drive circuit 23e may be activated and controlled such that a rotation direction and a rotation amount of the selection actuator 42 become a rotation direction and a rotation amount which cause the manual valve 41 to be moved from the current range position Tm to a position corresponding to the selector lever position Dr (instruction range).

As described above, the manual valve 41 may be moved in accordance with the selection operation (range change) with the selector lever 21a under the electronic control, and the manual valve 41 may be moved to the range position instructed by the driver.

While the manual valve 41 is located at the neutral (N) range position as shown in FIG. 2, the line pressure circuit 43 may be connected to the enclosed space between the lands at both ends of the spool 41a to prevent the line pressure PL from being removed. Also, the forward pressure circuit 44 and the reverse pressure circuit 45 are respectively connected to the drain ports 41b and 41c to remove the engagement pressure (forward clutch pressure) Pf of the forward clutch 8 and the engagement pressure (reverse brake pressure) Pr of the reverse brake 9 through the drain ports 41b and 41c. Both the forward clutch 8 and the reverse brake 9 are disengaged, and hence, the V-belt continuously variable transmission 2 becomes the neutral condition in which power transmission is inhibited.

Also, while the manual valve 41 is located at the forward automatic transmission (D) range position, the forward pressure circuit 44 is disconnected from the drain port 41b and connected to the line pressure circuit 43, so that the line pressure PL is directed to the forward clutch 8. Accordingly, the engagement pressure Pf of the forward clutch 8 is generated, and the forward clutch 8 is engaged.

Meanwhile, the reverse pressure circuit 45 is continuously connected to the drain port 41c. The engagement pressure Pr of the reverse brake 9 is removed through the drain port 41c, and hence, the reverse brake 9 is held disengaged. Because the reverse brake 9 is disengaged and the forward clutch 8 is engaged, the V-belt continuously variable transmission 2 may transmit forward rotational power.

While the manual valve 41 may be located at the reverse travel (R) range position, the reverse pressure circuit 45 may be disconnected from the drain port 41c and connected to the line pressure circuit 43, so that the line pressure PL is directed to the reverse brake 9. Accordingly, the engagement pressure Pr of the reverse brake 9 may be generated, and the reverse brake 9 is engaged.

Meanwhile, the forward pressure circuit 44 is continuously connected to the drain port 41b. The engagement pressure Pf of the forward clutch 8 is removed through the drain port 41b, and hence, the forward clutch 8 is held disengaged. Because the forward clutch 8 may be disengaged and the reverse brake 9 is engaged, the V-belt continuously variable transmission 2 may transmit reverse rotational power.

After the manual-valve spool 41a is shifted rightward of the reverse travel (R) range position (FIG. 2) to the park (P) range position, and while the manual valve 41 is located at the park (P) range position, the land at the left side of the spool 41a (FIG. 2) closes the line pressure circuit 43. Also, the forward pressure circuit 44 and the reverse pressure circuit 45 may be connected to the drain ports 41b and 41c, and the engagement pressure Pf of the forward clutch 8 and the engagement pressure Pr of the reverse brake 9 are removed through the drain ports 41b and 41c. Accordingly, both the forward clutch 8 and the reverse brake 9 may be disengaged, and hence, the V-belt continuously variable transmission 2 becomes the neutral condition in which power transmission is inhibited.

Because the selector lever 21a is located at the D range position, while the transmission controller 23 causes the manual valve 41 to be located at the corresponding D range position under the electronic control, i.e., while the V-belt continuously variable transmission 2 is in the forward-rotational-power transmitting condition as a result of the engagement of the forward clutch 8 and the disengagement of the reverse brake 9, the transmission controller 23 uses the vehicle speed VSP detected by the sensor 24 and the throttle valve opening TVO obtained by the engine controller 16, and further obtains a target input rotational speed (target gear ratio) with reference to a predetermined gear-shift map. The target input rotational speed is desirable for a current operation condition. Then, a gear-shift instruction to achieve the target input rotational speed is supplied to the shift solenoid 53, so as to continuously shift the current transmission input rotational speed to the target input rotational speed.

Because the selector lever 21a is located at the R range position, while the transmission controller 23 causes the manual valve 41 to be located at the corresponding R range position under the electronic control, i.e., while the V-belt continuously variable transmission 2 is in the reverse-rotational-power transmitting condition as a result of the disengagement of the forward clutch 8 and the engagement of the reverse brake 9, the transmission controller 23 supplies a gear-shift instruction to the shift solenoid 53, so as to achieve a reverse input rotational speed corresponding to the lowermost (low) gear ratio. Accordingly, the V-belt continuously variable transmission 2 transmits reverse rotation with a constant rotation ratio.

Figure 5:
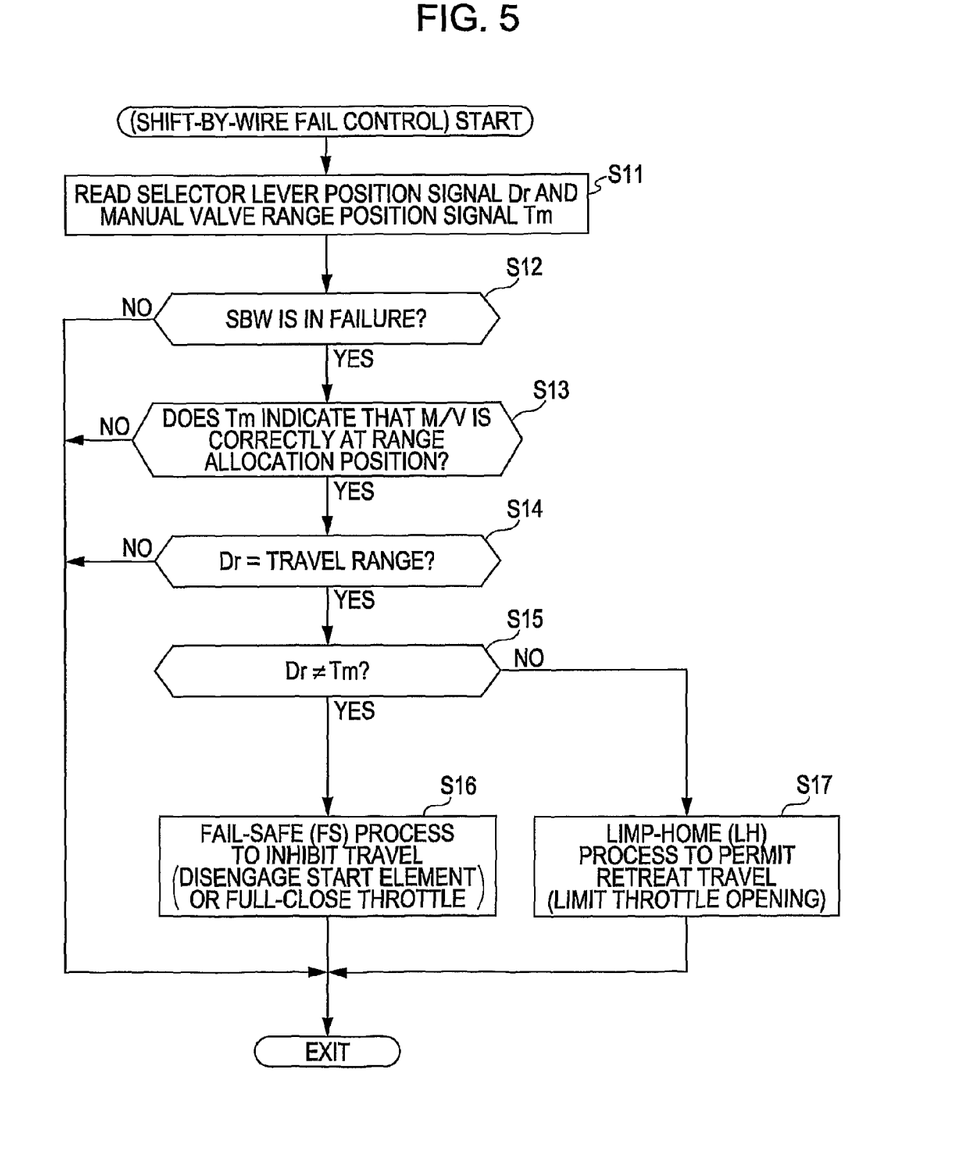
FIG. 5 is a flowchart showing a shift-by-wire fail control program executed by the transmission controller in FIG. 1.

When the shift-by-wire system is in a failure in which the manual valve 41 is not moved in accordance with the selection operation with the selector lever 21a because of, for example, a failure in the selection actuator 42, or a failure in the shift-by-wire control section 23a in FIG. 4, the transmission controller 23 detects the failure through a known self-diagnosis, and executes a control program shown in FIG. 5. That is, shift-by-wire fail control is performed as follows.

For the control, as shown in FIG. 4, a shift-by-wire fail control section 23f may be arranged in the transmission controller 23. The shift-by-wire fail control section 23f performs the self-diagnosis for the failure in the shift-by-wire system, and performs the shift-by-wire fail control in FIG. 5 when the failure occurs.

In step S11 in FIG. 5, the transmission controller 23 (shift-by-wire fail control section 23f) reads a position signal (selection operation position signal) Dr of the selector lever 21a, and a current range position signal Tm of the manual valve 41.

In step S12 serving as shift-by-wire fail detecting means, the transmission controller 23 (shift-by-wire fail control section 23f) may acquire information from the shift-by-wire control section 23a as shown in FIG. 4, may perform a self-diagnosis for a failure in the shift-by-wire system (SBW) using the information, and checks whether or not the shift-by-wire system (SBW) has failed.

If the shift-by-wire system (SBW) has not failed, the shift-by-wire fail control in FIG. 5 will not be necessary. Thus, the control is ended, and exited from the control program in FIG. 5.

While it is determined that the shift-by-wire system (SBW) is failed in step S12, the shift-by-wire fail control in FIG. 5 is necessary. In step S13, it is checked whether or not the manual valve 41 is located correctly at one of range (P, R, N, D) allocation positions on the basis of the current range position signal Tm of the manual valve 41.

Here, range (P, R, N, D) allocation positions of the manual valve 41 represent the positions of the manual valve 41 (spool 41a), each of which is provided when the detent ball 48 is completely fitted into the valley of corresponding one of the triangular cut portions 41p, 41r, 41n, and 41d. If the manual valve 41 is correctly located at one of the range (P, R, N, D) allocation positions, the manual valve 41 achieves the predetermined gear-shift mode for the range position.

However, if the manual valve 41 is not correctly located at one of the range (P, R, N, D) allocation positions, the detent ball 48 is not completely fitted into one of the valleys of the triangular cut portions 41p, 41r, 41n, and 41d, and is located on one of inclined surfaces between the valleys of the triangular cut portions 41p, 41r, 41n, and 41d as shown in FIG. 3. The manual valve 41 does not achieve the predetermined gear-shift mode for the range position.

Thus, if it is determined that the manual valve 41 is not correctly located at one of the range (P, R, N, D) allocation positions on the basis of the manual valve range position signal Tm in step S13, the manual valve 41 may not achieve the predetermined gear-shift mode for the range position. Hence, if the shift-by-wire fail control is performed in this state, an adverse effect is exerted rather than a case in which the control is not performed. Also, the shift-by-wire fail control may be ineffective. In order to prevent these, the control may be ended and exited from the control program in FIG. 5.

If it is determined that the manual valve 41 is correctly located at one of the range (P, R, N, D) allocation positions in step S13, the above-mentioned adverse effect is not exerted even when the shift-by-wire fail control is performed, and the shift-by-wire fail control is effective. The control progresses to step S14, in which it is checked whether or not the travel range (D, R range) is instructed, on the basis of the selector lever position (selection operation) signal Dr.

If it is determined that the travel range (D, R range) is not instructed in step S14, on the basis of the selector lever position (selection operation) signal Dr, it means that the driver does not want to travel. Thus, the shift-by-wire fail control in FIG. 5 should not be performed. The control is ended and exited from the control program in FIG. 5.

If it is determined that the travel range (D, R range) is instructed in step S14, on the basis of the selector lever position (selection operation) signal Dr, it means that the driver wants to travel. Thus, the control progresses to step S15, in which it is checked whether or not the vehicle travel position obtained from the current range position Tm of the manual valve 41 inhibited from being moved due to the failure in the shift-by-wire system mismatches the vehicle travel direction intended by the driver through the selector lever position (selection operation) signal Dr.

If the vehicle travel direction obtained from the manual-valve range position Tm mismatches the vehicle travel direction intended by the driver through the selector lever position (selection operation) signal Dr in step S15, when the vehicle makes the retreat travel for a failure in the shift-by-wire system regardless of the mismatch, the vehicle moves in a direction opposite to the vehicle travel direction intended by the driver, resulting in the driver feeling uncomfortable. Thus, the control progresses to step S16 serving as transmission output reducing means, in which a fail-safe (FS) process for inhibiting the vehicle from traveling is performed.

In an exemplary fail-safe (FS) process for inhibiting the vehicle from traveling, the transmission controller 23 (shift-by-wire fail control section 23f) transmits ON signals to the forward-pressure-circuit shut-off valve 51 (solenoid 51b) and the reverse-pressure-circuit shut-off valve 52 (solenoid 52b) through signal paths as shown in FIGS. 1 and 4. With these ON signals, the forward clutch pressure Pf and the reverse brake pressure Pr are removed as described with reference to FIG. 2. Accordingly, the forward clutch 8 and the reverse brake 9 are disengaged regardless of the range position of the manual valve 41, and hence, the V-belt continuously variable transmission 2 is in the neutral condition in which power transmission is inhibited.

In another exemplary fail-safe (FS) process for inhibiting the vehicle from traveling, the transmission controller 23 (shift-by-wire fail control section 23f) may transmit signals, which cause the throttle valve opening (TVO) to be fully closed, to the engine controller 16. With these signals, the output of the engine 1 is set to a lowermost value.

With any of these fail-safe (FS) processes, the vehicle may be inhibited from traveling. Priority is given to the elimination of the uncomfortable feeling of the driver because the vehicle moves in the direction opposite to the vehicle travel direction intended by the driver, rather than the achievement of the retreat travel for the failure in the shift-by-wire system.

If the vehicle travel direction obtained from the manual-valve range position Tm matches the vehicle travel direction intended by the driver through the selector lever position (selection operation) signal Dr in step S15, even when the vehicle makes the retreat travel for the failure in the shift-by-wire system, the vehicle moves in the same direction as the vehicle travel direction intended by the driver, the control progresses to step S17 serving as motor output limiting means, in which a limp-home (LH) process is performed for limiting the output of the engine 1 while engine output permitting the vehicle to make the retreat travel by its own power is remained.

In the limp-home (LH) process for limiting the output of the engine 1 so as to permit the vehicle to make the retreat travel, the transmission controller 23 (shift-by-wire fail control section 23f) transmits instructions, which limit a maximum opening of the throttle valve opening (TVO) to an opening capable of achieving the above-mentioned limitation of the engine output (for example, ⅛ opening), to the engine controller 16. With these instructions, the output of the engine 1 is limited.

In the limp-home (LH) process, the forward-pressure-circuit shut-off valve 51 (solenoid 51b) and the reverse-pressure-circuit shut-off valve 52 (solenoid 52b) are held in OFF states. The forward clutch 8 or the reverse brake 9 is engaged depending on the range position of the manual valve 41, and hence, the V-belt continuously variable transmission 2 is in the condition capable of transmitting the forward rotational power or the condition capable of transmitting the reverse rotational power.

With the limp-home (LH) process, the vehicle with its shift-by-wire system failed may make the retreat travel from the stop position to a repair shop, driver's home, or a safe parking lot by its own power. Thus, the problem of the conventional device, in which the vehicle is inhibited from traveling from the stop position, may be solved.

Because the vehicle travel direction of the retreat travel matches the vehicle travel direction intended by the driver, and because the retreat travel is a low-speed travel under the limitation of the engine output, the driver does not feel uncomfortable, and may make the retreat travel safely.

Figure 6:
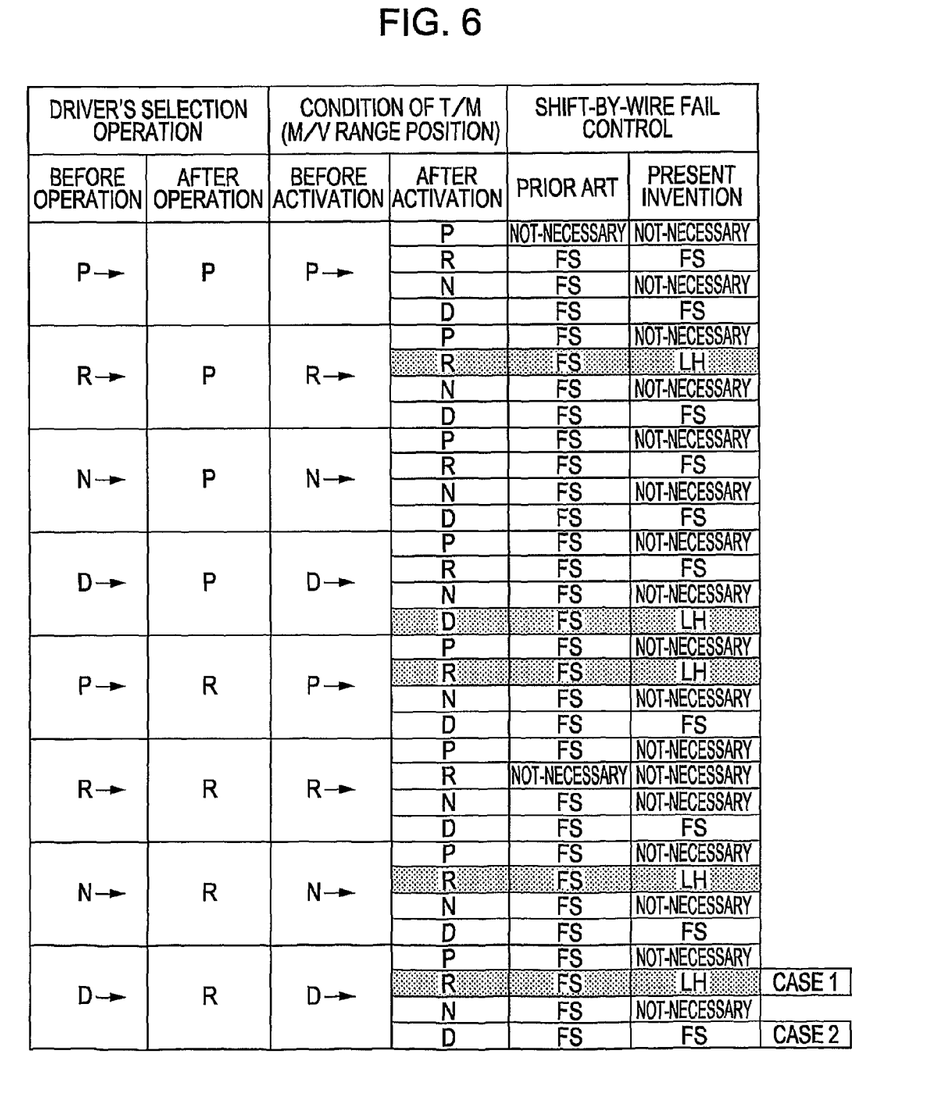
FIG. 6 is a table showing control contents of the shift-by-wire fail control shown in FIG. 5 respectively for failure conditions of a shift-by-wire system.
Figure 7:
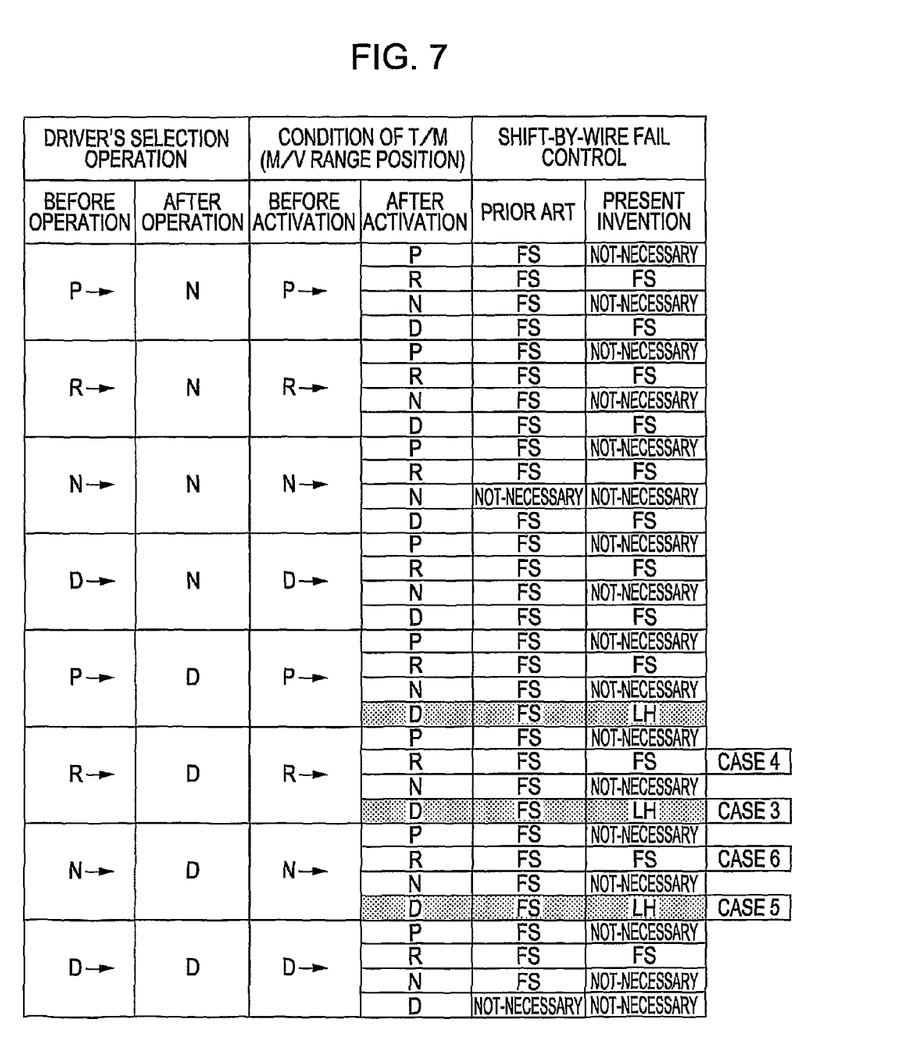
FIG. 7 is a table showing control contents of the shift-by-wire fail control shown in FIG. 5 respectively for other failure conditions of the shift-by-wire system.

With the above-described shift-by-wire fail control of this embodiment, in failure conditions of the shift-by-wire system illustrated as shaded regions in FIGS. 6 and 7, although the vehicle is inhibited from traveling due to the fail-safe (FS) process in the prior art, the vehicle may make the retreat travel from the stop position to a repair shop, driver's home, or a safe parking lot by its own power by the limp-home (LH) process.

The failure conditions of the shift-by-wire system in cases 1 to 6 shown in FIGS. 6 and 7 are described as typical examples.

Case 1 in FIG. 6 is shift-by-wire fail control performed in a situation that when the driver makes a D-to-R selection operation from the D range to the R range, the manual valve 41 (M/V) is correctly moved from the D range position to the R range position and the V-belt continuously variable transmission 2 (T/M) is shifted from the D range condition to the R range condition, however, after the shift, the manual valve (M/V) cannot be moved from the R range position due to a failure in the shift-by-wire system. In the prior art, the vehicle was inhibited from traveling by the fail-safe (FS) process although a vehicle travel direction intended by the D-to-R selection operation by the driver matches a vehicle travel direction caused by setting of the manual valve (M/V) at the R range position and the driver does not feel uncomfortable when the vehicle makes the retreat travel. However, in this embodiment, because the limp-home (LH) process is performed, the vehicle may make the retreat travel from the stop position to the safe parking lot by its own power without uncomfortable feeling.

Case 2 in FIG. 6 is shift-by-wire fail control performed in a situation that although the driver makes the D-to-R selection operation from the D range to the R range, the manual valve 41 (M/V) is not correctly moved from the D range position to the R range position and the V-belt continuously variable transmission 2 (T/M) is held in the D range condition. In this embodiment, with regard to the mismatch between a vehicle travel direction intended by the driver through the D-to-R selection operation and a vehicle travel direction caused by setting of the manual valve (M/V) at the D range position, the vehicle is inhibited from traveling by the fail-safe (FS) process. Accordingly, the shift-by-wire fail control may be provided such that priority is given to the elimination of the uncomfortable feeling of the driver resulted from that the vehicle moves in the direction opposite to the vehicle travel direction intended by the driver.

Case 3 in FIG. 7 is shift-by-wire fail control performed in a situation that when the driver makes an R-to-D selection operation from the R range to the D range, the manual valve 41 (M/V) is correctly moved from the R range position to the D range position and the V-belt continuously variable transmission 2 (T/M) is shifted from the R range condition to the D range condition, however, after the shift, the manual valve (M/V) cannot be moved from the D range position due to a failure in the shift-by-wire system. In the prior art, the vehicle would have been inhibited from traveling by the fail-safe (FS) process although a vehicle travel direction intended by the driver through the R-to-D selection operation matches a vehicle travel direction caused by setting of the manual valve (M/V) at the D range position and the driver does not feel uncomfortable when the vehicle makes the retreat travel. However, in this embodiment, because the limp-home (LH) process is performed, the vehicle may make the retreat travel from the stop position to the safe parking lot by its own power without uncomfortable feeling.

Case 4 in FIG. 7 is shift-by-wire fail control performed in a situation that although the driver makes the R-to-D selection operation from the R range to the D range, the manual valve 41 (M/V) is not correctly moved from the R range position to the D range position and the V-belt continuously variable transmission 2 (T/M) is held in the R range condition. In this embodiment, with regard to the mismatch between a vehicle travel direction intended by the driver through the R-to-D selection operation and a vehicle travel direction caused by setting of the manual valve (M/V) at the R range position, the vehicle is inhibited from traveling by the fail-safe (FS) process. Accordingly, the shift-by-wire fail control may be provided such that priority is given to the elimination of the uncomfortable feeling of the driver resulted from that the vehicle moves in the direction opposite to the vehicle travel direction intended by the driver.

Case 5 in FIG. 7 is shift-by-wire fail control performed in a situation that when the driver makes an N-to-D selection operation from the N range to the D range, the manual valve 41 (M/V) is correctly moved from the N range position to the D range position and the V-belt continuously variable transmission 2 (T/M) is shifted from the N range condition to the D range condition, however, after the shift, the manual valve (M/V) cannot be moved from the D range position due to a failure in the shift-by-wire system. In the prior art, the vehicle would have been inhibited from traveling by the fail-safe (FS) process although a vehicle travel direction intended by the driver through the N-to-D selection operation matches a vehicle travel direction caused by setting of the manual valve (M/V) at the D range position and the driver does not feel uncomfortable when the vehicle makes the retreat travel. However, in this embodiment, because the limp-home (LH) process is performed, the vehicle may make the retreat travel from the stop position to the safe parking lot by its own power without uncomfortable feeling.

Case 6 in FIG. 7 is shift-by-wire fail control performed in a situation that although the driver makes the N-to-D selection operation from the N range to the D range, the manual valve 41 (M/V) is not correctly moved from the N range position to the D range position but is moved to the R range position in a reverse direction and the V-belt continuously variable transmission 2 (T/M) is shifted to the R range condition. In this embodiment, with regard to the mismatch between a vehicle travel direction intended by the driver through the N-to-D selection operation and a vehicle travel direction caused by setting of the manual valve (M/V) at the R range position, the vehicle is inhibited from traveling by the fail-safe (FS) process. Accordingly, the shift-by-wire fail control may be provided such that priority is given to the elimination of the uncomfortable feeling of the driver resulted from that the vehicle moves in the direction opposite to the vehicle travel direction intended by the driver.

In the illustrated examples, it is described that the automatic transmission is the V-belt continuously variable transmission 2. However, the concept of the present disclosure may attain similar action and advantage when the automatic transmission is a planetary-gear-set step automatic transmission, an automated manual transmission, or any other transmission mechanism known to those having ordinary skill.

In the case of the planetary-gear-set step automatic transmission, friction elements for start may include a friction element for selection of a forward first speed and a friction element for selection of a reverse gear position. In the case of the automated manual transmission, friction elements for start include an automatic clutch for selection of a forward first speed and an automatic clutch for selection of a reverse gear position. Thus, in the case of the planetary-gear-set step automatic transmission, shut-off valves 51 and 52 in FIG. 2 may be inserted into engagement pressure circuits of the friction element for selection of the forward first speed and the friction element for selection of the reverse gear position. In the case of the automated manual transmission, shut-off valves 51 and 52 in FIG. 2 may be inserted into engagement pressure circuits of the automatic clutch for selection of the forward first speed and the automatic clutch for selection of the reverse gear position.

Advantageously, embodiments disclosed herein include a shift-by-wire fail control device for a vehicle with an automatic transmission which permits the vehicle to make retreat travel from a stop position by its own power. The shift-by-wire automatic transmission may comprise a vehicle including a manual valve, the manual valve achieving a predetermined gear-shift mode when the manual valve is moved in accordance with a selection operation by a driver under electronic control to a corresponding range position among ranges defining gear-shift modes of the automatic transmission. Also, the vehicle may be capable of traveling by power output from a motor via the automatic transmission. The shift-by-wire control device may include shift-by-wire fail detecting means for detecting a failure in a shift-by-wire system, the failure in which the manual valve is not moved in accordance with the selection operation; and motor output limiting means for limiting the output of the motor within a range permitting retreat travel of the vehicle when the shift-by-wire fail detecting means detects the failure in the shift-by-wire system and if a vehicle travel direction intended by the driver through the selection operation matches a vehicle travel direction obtained from a current range position of the manual valve.

With this configuration, the vehicle may make the retreat travel from the stop position to a repair shop, driver's home, or a safe parking lot, by its own power. Thus, the problem of the conventional device, which is the inhibition of the vehicle from traveling from the stop position, may be solved.

In addition, because the retreat travel may be made when the vehicle travel direction obtained from the current range position of the manual valve inactivated due to the failure matches the vehicle travel direction intended by the driver through the selection operation, the driver does not feel uncomfortable because the vehicle travel direction of the retreat travel matches the intention (vehicle travel direction) by the driver through the selection operation.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A shifting apparatus of a vehicle transmission, the shifting apparatus comprising:
    an actuator to direct the vehicle transmission into a travel range setting;
    a selector to select a desired travel range setting;
    an actuator detector to output the travel range setting of the actuator to a transmission controller;
    a selector detector to output the desired travel range setting of the selector to the transmission controller;
    the transmission controller to move the actuator into the travel range setting in response to the desired travel range setting of the selector;
    a restrictor device to restrict an output of a drive motor if:
        failure of a shift-by-wire system is detected,
        the desired travel range setting determined by the selector detector is within a travel range, and
        a vehicle travel direction corresponding to the travel range setting detected by the actuator detector is the same as a desired vehicle travel direction corresponding to the desired travel range setting detected; and
    a shut-off device to stop an output of the vehicle transmission if the desired travel range setting is within the travel range and if the vehicle travel direction corresponding to the travel range setting detected by the actuator detector is opposite from the desired vehicle travel direction corresponding to the desired travel range setting,
    wherein the travel range corresponds to a forward travel range (D) and a reverse travel range (R).

2. The shifting apparatus of claim 1, wherein the actuator comprises a manual valve.

3. The shifting apparatus of claim 1, wherein the travel range setting of the actuator is one of a park range (P), the forward travel range (D), the reverse travel range (R), and a neutral (N) range.

4. The shifting apparatus of claim 1, wherein the desired travel range setting of the selector is one of a park range (P), a forward travel range (D), a reverse travel range (R), and a neutral (N) range.

5. The shifting apparatus of claim 1, further comprising a shut-off device to stop an output of the vehicle transmission if the actuator detector outputs a travel range setting corresponding to a vehicle travel direction that is opposite from a desired vehicle travel direction corresponding to a desired travel range setting outputted by the selector detector.

6. The shifting apparatus of claim 5, wherein the restrictor device is configured to shut off the output of the drive motor if the vehicle travel direction is opposite from the desired vehicle travel direction.

7. The shifting apparatus of claim 1, wherein the transmission controller comprises an electrical link between the actuator and the selector.

8. The shifting apparatus of claim 1, wherein the transmission controller comprises a hydraulic link between the actuator and the selector.

9. The shifting apparatus of claim 1, wherein the transmission controller comprises a mechanical link between the actuator and the selector.

10. The shifting apparatus of claim 1, wherein the vehicle transmission is a continuously variable transmission.

11. A method to control a vehicle transmission, the method comprising:
    detecting a travel range setting of the vehicle transmission;
    detecting a desired travel range setting of a selector;
    detecting whether a shift-by-wire system failure has occurred; and
    entering a limp-home mode allowing a restricted output of a drive motor only if:
        failure of the shift-by wire system is detected; and
        a detected vehicle travel direction corresponding to the detected travel range setting is the same as a desired travel direction corresponding to the desired travel range setting,
    wherein the travel range corresponds to a forward travel range (D) and a reverse travel range (R).

12. The method of claim 11, further comprising entering a fail-safe mode if the detected vehicle travel direction is opposite from the desired travel range setting.

13. The method of claim 12, wherein the fail-safe mode comprises shutting off torque output of the vehicle transmission in both a reverse and a forward direction.

14. The method of claim 12, wherein the fail-safe mode comprises shutting off torque output of the vehicle transmission in one of a reverse and a forward direction.

15. A vehicle including a drive motor and a vehicle transmission, the vehicle comprising:
    an indicating means for indicating a desired travel range setting;
    a detecting means for detecting a travel range setting of the vehicle transmission in response to the indicated desired travel range setting; and
    a restricting means for restricting an output of a drive motor if:
        failure of a shift-by-wire system is detected,
        the directed travel range setting is within a travel range, and
        a vehicle travel direction corresponding to the travel range setting detected by the detecting means is the same as a desired vehicle travel direction corresponding to the desired travel range setting detected; and
    a shut-off means to stop an output of the vehicle transmission if the desired travel range setting is within the travel range and if the vehicle travel direction corresponding to the travel range setting detected by the detecting means is opposite from the desired vehicle travel direction corresponding to the desired travel range setting,
    wherein the travel range corresponds to a forward travel range (D) and a reverse travel range (R).

* * * * *